United States Patent [19]

Scott et al.

[11] 4,318,084

[45] Mar. 2, 1982

[54] CONTROL SYSTEM FOR APPLIANCES AND THE LIKE

[75] Inventors: Charles E. Scott, Noblesville; Robert L. Smith, Indianapolis, both of Ind.; Robert G. Bristol, Everett, Mass.

[73] Assignee: Emhart Industries, Inc., Indianapolis, Ind.

[21] Appl. No.: 99,915

[22] Filed: Dec. 3, 1979

[51] Int. Cl.³ .............................................. H01H 7/00
[52] U.S. Cl. .............................. 340/309.1; 340/309.4
[58] Field of Search ................... 307/141, 141.4, 309.1, 307/309.4

[56] References Cited

U.S. PATENT DOCUMENTS

| 4,035,795 | 7/1977 | Fosnough | 307/141.4 |
| 4,084,237 | 4/1978 | Beachem | 307/141 |
| 4,104,542 | 8/1978 | Karklys | 307/141.4 |
| 4,224,530 | 9/1980 | Simcoe | 307/141 |

Primary Examiner—Harold I. Pitts
Attorney, Agent, or Firm—Robert F. Meyer; David M. Gomes

[57] ABSTRACT

A system for controlling the operation of an appliance of the type having a plurality of machine functions to be activated and deactivated in accordance with a control strategy includes a plurality of selectable cycles each made up of a series of events and an array of user actuatable membrane switching devices for selecting at least one cycle of operation for the appliance. The array of membrane switching devices also allow the user to program an optional event within the selected cycle and to select a time period for at least one of the events of the selected cycle. A control logic includes a resident program with a series of instructions for the operation of the appliance and a memory for storing data which is retrievable in response to actuation of the membrane switching devices so that the appliance operates in accordance with the resident program and the retrieved data. A display panel includes various individual displays for indicating the selected cycle, optional event, time period for the one event of the cycle, and the time remaining in the selected cycle. A method of controlling the operation of the appliance includes displaying a time period for and the time remaining in a selected cycle, continuously monitoring the membrane switching devices to detect user actuated changes in the operation of the appliance during the selected cycle, and disabling certain membrane switching devices during the selected cycle to thereafter eliminate the possibility of user actuated changes associated with such disabled switching devices.

13 Claims, 3 Drawing Figures

CONTROL SYSTEM FOR APPLIANCES AND THE LIKE

BACKGROUND OF THE INVENTION

1. Field of the Invention

The present invention relates generally to control systems for controlling the operation of appliances of the type having a plurality of machine functions to be activated and deactivated. More particularly, the present invention is concerned with improvements in such control systems which give the applicance greater versatility and user feedback.

2. Statement of the Prior Art

There are many control circuits and control systems for controlling the operation of various types of appliances which are well-known in the prior art. For example, the control circuits and systems disclosed in U.S. Pat. No. 3,774,056 and No. 4,011,428 are typical of the related art. While these prior art control circuits were adequate at the time for controlling appliances and the like of the type described hereinabove, the demand for greater capabilities of the appliance and for additional features associated therewith have required that various improvements be made to such prior art systems as those disclosed in U.S. Pat. No. 3,774,056 and No. 4,011,428.

In accordance with a broad concept of the present invention, various improvements are provided to increase flexibility and user feedback with respect to the operation of appliances.

SUMMARY OF THE INVENTION

Accordingly, it is one object of the present invention to provide an improved control system for an appliance such as that previously described which includes an array of user actuatable membrane switching devices for allowing the user of the appliance to select one of a plurality of cycles for the operation of the appliance, one of a plurality of optional events within the selected cycle, and one of a plurality of time periods for at least one of the events of the selected cycle.

A further object of the present invention is to provide a control system of the type previously described which includes a microprocessor having a resident program with a series of instructions established for the operation of the appliance and a memory including stored data which is retrievable in response to actuation of one or more of the membrane switching devices to cause the appliance to operate in accordance with the resident program and the retrieved data. The resident program and data associated with a selected cycle are changeable by the user of the appliance during the operation of the appliance. By actuating other membrane switching devices, a selected cycle may also be programmed to include an additional event, and the preprogrammed time for one event of the selected cycle may also be changed by actuating other membrane switching devices. These features give the user of the appliance a high degree of flexibility with respect to how the appliance should operate in response to the needs of the particular user.

A display for indicating the cycle selected, the optional event selected, and either the preprogrammed or an alternative time period for the one event of the selected cycle is included in the control system described above. Further, the system includes means for displaying the length of and the time remaining in the selected cycle.

In accordance with the present invention, the user may reprogram the operation of the appliance while the appliance is operating in accordance with the initial selections of the user. During the time period of the selected or programmed cycle, certain membrane switching devices are disabled at various points in time to thereafter eliminate the ability of the user to actuate such membrane switching device and change the operation of the appliance.

The control system of the present invention is particularly adaptable for controlling the operation of dishwasher and clothes-washing appliances which include a series of events such as wash, rinse, and dry. More particularly, the control system of the present invention allows the user to select one cycle from a choice of six cycles, to select one optional event from a choice of three optional events, and to change the preprogrammed time period for the wash event to allow it to operate for ten, twenty, or thirty minutes. The cycle, optional event, and time period are each indicated by the display and as the appliance proceeds through each event, the particular event is also indicated on the display. Further, the time remaining in the particular cycle selected is continuously displayed in one-minute increments. In accordance with the present invention, the user has the ability to change the selected cycle, the optional event, or the time period associated with the wash event during the operation of the appliance; however, various membrane switching devices are disabled at various times during the selected cycle so that changes associated with such membrane switching devices cannot be made thereafter.

While various objects of the present invention have been described hereinabove, other features and advantages of the invention will become apparent from the following detailed description of an embodiment thereof, which description should be considered in conjunction with the accompanying drawings, in which:

DETAILED DESCRIPTION OF THE DRAWINGS

The control system of the present invention is particularly adaptable for controlling the operation of a household dishwasher by sequencing the dishwasher through the proper wash, rinse, and dry events and accordingly it will be described hereinafter with respect to its application to such a dishwasher. It should, however, be noted that the control system may also be employed to control the operation of various other appliances, for example a clothes washer, of the type having a plurality of machine functions which are to be activated and deactivated in accordance with a particular control strategy.

The typical machine functions associated with a dishwasher include a water valve, heater, blower, motor, and a mechanism for operating a rinse agent injection and detergent cup. It will, of course, be understood that any particular dishwasher may include less or more machine functions and the present invention is not necessarily limited to these particular functions. In order to control the operation of the dishwasher, each of these machine functions must be activated and deactivated at various points in time. When these machine functions are activated and deactivated is determined by the control strategy associated with a control system. In conventional control systems, the exact times and time periods for activating and deactivating these machine functions are specifically fixed by the control strategy, leaving the user no ability to program various options into the operation of the dishwasher. Further, while the user is able to determine the entire time period associated with a complete cycle of operation of the dishwasher, conventional control systems do not indicate to the user the time remaining in the selected cycle, and therefore the user has little, if any, feedback as to what is occurring within the dishwasher.

The control system of the present invention gives the user six cycle selections for the operation of the appliance, three selections for optional events within any one particular cycle and three selectable time periods for the wash event of any one particular cycle. The user may select by actuating a panel switch a normal wash cycle, a longer pot and pan wash cycle, a shorter water mizer cycle which deletes two rinses before the wash event, a rinse and hold cycle which allows later washing, a cancel drain cycle, or a plate warm cycle. Included within each of these cycles is the option to select a power mizer function which will prevent the heater from operating the dry event, a sani-temp option which causes the heater to operate during the last rinse event when incoming water is not at the proper temperature, and the option to change the preprogrammed time period for the wash event of a particular cycle.

Figure 1:
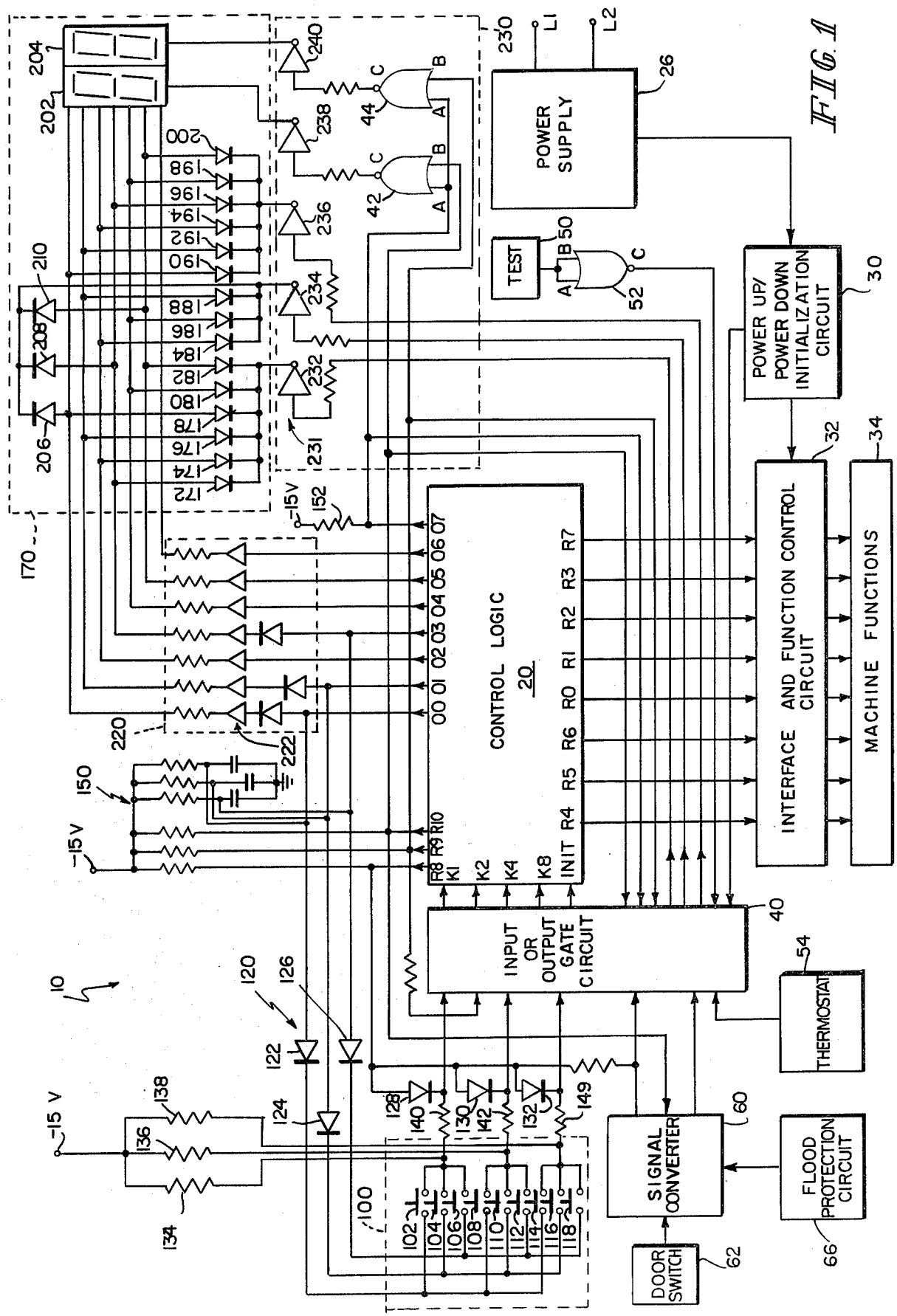
FIG. 1 is a schematic partial circuit and partial functional block diagram of a control system constructed in accordance with the present invention.
Figure 2:
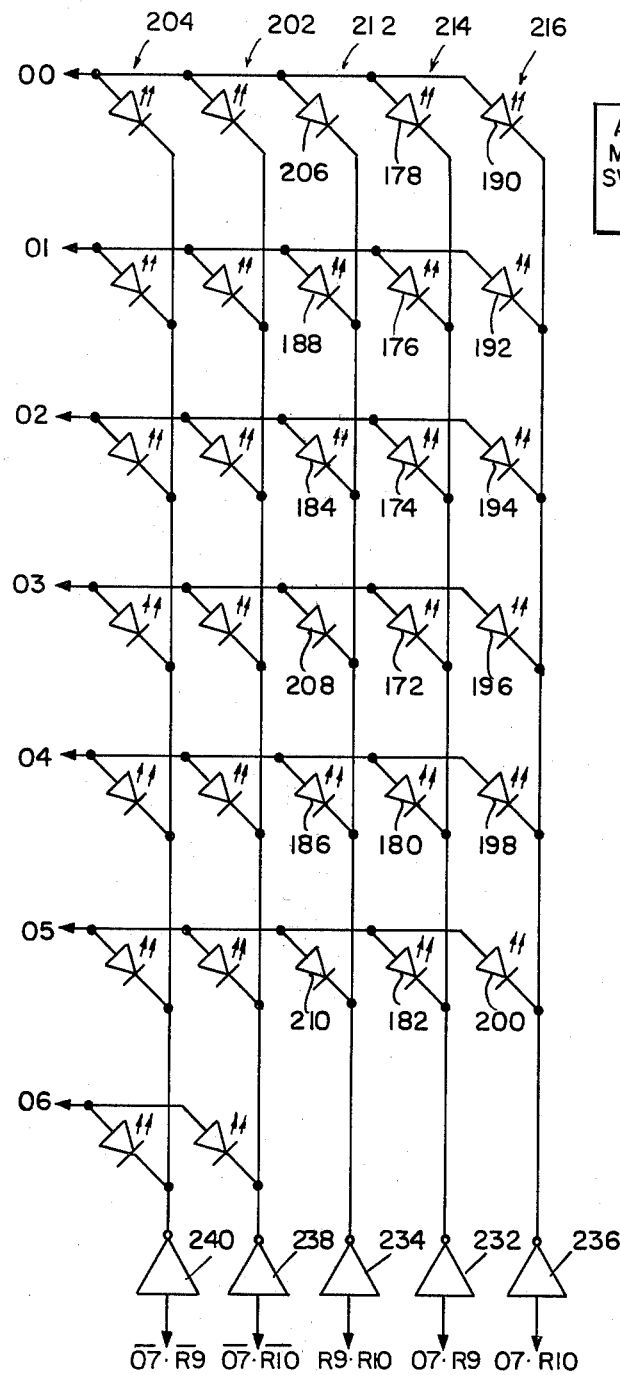
FIG. 2 is a detailed schematic of a section of the control system of FIG. 1.

Turning now to FIGS. 1 and 2, a control system 10 for controlling the operation of a household dishwasher includes the cycles, options, and events described hereinabove and a control logic 20 which monitors the status of all inputs, controls the display of selected cycles and options, position within the cycle, and time remaining in the cycle, and activates and deactivates all machine functions at proper points in time in accordance with a resident program (control strategy) and stored data retrievable in response to user programming. In one embodiment of the control system 10, the control logic 20 is a TMS-1000 microcomputer of the type manufactured by Texas Instruments Incorporated, Dallas, Tex. The microcomputer 20 will include firmware establishing a resident program (ROM) for the overall operation of the dishwasher and a memory storing various retrievable data (RAM) associated with the cycles and options programmable by the user. Accordingly, when the user selects a particular cycle or option, the data is retrieved and in conjunction with the resident program the operation of the appliance is controlled by the system 10.

As illustrated in FIG. 1, the microcomputer 20 includes a series of K input terminals K1, K2, K4, and K8; a series of O output terminals O0, O1, O2, O3, O4, O5, O6, and O7; and a series of R output terminals R0, R1, R2, R3, R4, R5, R6, and R7. The microcomputer 20 also includes an initializing input INIT. In order for the microcomputer 20 to operate, it must have −15 volts present at its INIT input after a suitable delay. When the control system 10 is idle and no cycles have been selected, outputs R8, R9, R10, and O7 should all have waveforms present. Further, outputs O0, O1, and O3 should have waveforms present since these outputs are used as inputs for the programming means of the control system 10 and are necessary before a particular cycle can be selected by the user. The outputs O2, O4, O5, and O6 should have no waveforms present during the idle period, and in fact should have −6 volts DC present during such period. Output terminals R0 and R7 should have −14 volts present during the idle period and input K1, K2, and K4 associated with the programming means and an external input K8 should have waveforms present during the idle period.

External AC lines L1, L2 are connected to a power supply 26 of the control system 10. Any conventional power supply may be employed to provide both a −12 and −15 DC voltage. In one embodiment of a power supply 26, two series pass regulator circuits are connected to a center tapped transformer to provide a −15 volt DC supply and a zener diode is then utilized to obtain the −12 volts. Accordingly, the absence of the −15 volt supply will cause the −12 volt supply to be turned off.

As previously indicated, the microcomputer 20 must be initiated in a predetermined sequence so that the resident program will be started at the proper point. This is accomplished by a power-up/power-down initialization circuit 30. Again, conventional means may be employed for initializing the microcomputer 20. The circuit 30 should include a calculated delay to allow the microcomputer 20 to monitor the supply voltage for a few milliseconds before the voltage at the INIT input reaches −15 volts. The voltage of the INIT input should remain approximately zero for 4 milliseconds after the microcomputer 20 is powered-up and at the end of approximately 10 milliseconds the voltage should be about $\frac{1}{2}$ of its final value of −15 volts.

An interface and function control circuit 32 is responsive to the R output terminals R0, R1, R2, R3, R4, R5, R6, and R7 and controls the activation and deactivation of the various machine functions 34. For a household dishwasher, these machine functions may include a water valve, heater, blower, motor, and mechanisms for operating a rinse agent injection and detergent cup. The lighter duty loads associated with some of these machine functions are controlled by low-current triacs and the heavier loads are controlled by relays. Although the interface and function control circuit 32 may be of any conventional construction, in one embodiment the circuit 32 includes a darlington transistor array which is used to drive the machine functions 34. A plurality of such arrays may be included in a single integrated circuit package.

Due to the limited number of input and output terminals of the microcomputer 20, some input/output port expansion is necessary. This is accomplished through the use of CMOS logic gates included in an input or output gate circuit 40. It will be understood that various types of gates may be employed to provide the necessary expansion of the input and output terminals. In one embodiment, the K input terminals are expanded using a NOR gate package such as the CD4025 and CD4001 integrated circuit packages manufactured by National Semiconductor Corporation, Santa Clara, Calif. In the same embodiment, output expansion of the R output terminals R8, R9, and R10 and the O output terminal O7 is accomplished by both a NOR gate package and an AND gate package such as the CD4001 and CD4081 integrated circuit packages manufactured by National Semiconductor Corporation. The two NOR gates 42 and 44 illustrated in FIG. 1 form a portion of the output expansion gate circuitry and are specifically shown for illustrative purposes. It should be noted that NOR gates 42, 44 each include two inputs A, B, and an output C.

The control system 10 may be placed in a test mode of operation and rapidly stepped through a selected cycle by closing a test switch 50. The signal provided by the test switch 50 is inverted by NOR gate 52 and expanded through the input or output gate circuit 40. It will be understood that NOR gate 52 could also be an inverter or other logic component. In the illustrated embodiment of control system 10, NOR gate 52 of integrated circuit package CD4001 is employed because of its availability within the circuit package. In the operation of the test switch 50, if no cycle has been selected, closure and release of the test switch 50 will result in automatic selection of the pots and pans cycle. Repeated closure and release of the test switch 50 will cause the control system 10 to step through all events and operations of either the user selected cycle or the pots and pans cycle. It should also be noted that upon release of the test switch 50, the control system 10 will proceed normally from any point in a cycle that has been arrived at by employing the test switch 50.

A thermostat 54 also forms a part of control system 10 and is employed to control the temperature of the water of the dishwasher. As can be seen from FIG. 1, the signal produced by thermostat 54 provides an input signal to the input or output gate circuit 40 for controlling the activation and deactivation of the heater of the machine functions 34. In one embodiment, opening of the thermostat 54 indicates a temperature below 150° F. and closing of the thermostat indicates a temperature above 150° F.

A conventional analog-to-digital converter 60 converts analog signals provided by a switch 62 associated with the door of the dishwasher and a float associated with a flood-protection circuit 66 to digital signals which can serve as inputs to the microcomputer 20. In operation, a signal supplied by the door switch 62 is input to the microcomputer 20 at input terminal K8 to generate the timing for the various cycles of the dishwasher. Accordingly, the opening of the door switch 62 will cause the timing of the cycle to cease. In other words, the door must be closed for the appliance to operate. Furthermore, the machine functions are provided the necessary voltage for their operation through the door switch 62 so that when the door switch 62 is opened, the machine functions are likewise deactivated. Importantly, however, the appropriate outputs at the R output terminals of the microcomputer 20 will still be present at the inputs of the interface and function control circuit 32, even though the door switch 62 is opened and the loads have been deactivated so that when the door switch 62 is closed, the operation will continue where stopped.

In the operation of the flood-protection circuit 66, a signal is provided to the microcomputer when a float switch is closed. When this signal is removed from the microcomputer 20, the control system 10 knows that the water level in the dishwasher has reached its maximum point. When the maximum level has been reached, the float switch will open and thereby turn off the water valve. During certain time periods of a selected cycle, the float switch of the flood-protection circuit 66 is monitored by the microcomputer 20. If during this monitoring the float switch should open (such as during the wash and dry events of a cycle), the microcomputer 20 interprets this as an indication that the dishwasher has been overfilled. The control system 10 immediately steps to the cancel drain cycle, turns on the motor, and flashes the wash, rinse, and dry indicators, and all other loads and indicators are turned off. This condition may be stopped by selecting an optional event which will turn the control system off by selecting a new cycle or by opening the door switch 62. If the flood conditions should reoccur, the above sequence of events will again be repeated. Loss of the flood control circuit 66 input signal for a predetermined time period will initiate flood protection except under certain limited conditions when the door switch 62 is open.

A user actuatable programming means 100 for programming the microcomputer 20 and causing data to be retrieved from the memory of the microcomputer for the operation of the dishwasher in accordance with a selected cycle, optional event, or wash time period includes an array of membrane switching devices 102–118. A membrane switching device includes a copper-clad MYLAR surface, plastic buttons, a plastic housing, a metal bracket, and a decorative label for each button. A copper pattern is etched on the MYLAR surface and the sheet of MYLAR is folded over with an insulating member interposed between the two layers. The insulating material is provided with apertures for the location of the switch contacts. By pressing on the surface above one of these contact areas, the two copper surfaces are caused to touch, thereby closing a particular switching device. In general, contact must be maintained between the two surfaces for a predetermined period of time before the switch is actuated. Further, simultaneously activating two or more switches will result in no selection.

In one embodiment, the six selectable cycles for the operation of the dishwasher are actuatable by touching one of the membrane switching devices 108–118, and the optional events are selectable by actuating membrane switching devices 102–106. Once a cycle has been selected, a predetermined delay occurs before the start of operation, thereby allowing the user to correct an error in cycle selection before the selected cycle starts. Actuation of membrane switching device 114 programs the microcomputer to operate the dishwasher in a normal wash cycle, wherein the wash time is preprogrammed for 20 minutes. Actuation of the membrane switching device 116 programs the microcomputer to operate the appliance in the water mizer cycle wherein the preprogrammed wash time is also 20 minutes. Actuation of the membrane switching device 112 programs the microcomputr 20 to operate the dishwasher in the pots and pans cycle wherein the preprogrammed wash time is 30 minutes. For any one of these selected cycles, the user of the appliance may also actuate membrane switching device 104 to reprogram the preprogrammed time period for the wash event of the selected cycle. Actuation of the membrane switching device 104 will cause the wash time to continuously sequence from 30 minutes to 20 minutes to 10 minutes. A sequence of selectable wash time periods will occur with each actuation of the membrane switching device 104. The microcomputer 20 will allow the wash time of the selected cycle to be changed anytime prior to the final wash of such cycle. Actuation of the membrane switching device 104 after the end of the drain just before the fill for the last wash will not change the indicated wash time, since the switching device 104 will have been disabled.

In accordance with the resident program or control strategy of the microcomputer 20, other membrane switching devices are disabled at various times during a selected cycle of operation of the appliance. For example, the membrane switching devices associated with the rinse and hold, water mizer, normal wash, pots and pans, and plate warm cycles are disabled by the microcomputer 20 before the fill of the dishwasher for the last wash so that the cycle of operation of the dishwasher may not be changed thereafter. Any new cycles selected by the user prior to the fill for the last wash will start such new selected cycle at the beginning of that cycle. Selection of the cancelled drain cycle by actuating membrane switching device 110 will at all times pre-empt any cycle of operation already selected. Further, selection of an optional event by actuating membrane switches 102–106 before the selection of a cycle will not program a selected optional event.

An input circuit 120 for the programming means 100 includes signals derived from three O output terminals O0, O1, and O3 of the microcomputer 20. As best illustrated in FIG. 1, these signals are applied to the membrane switching devices 102–118 through diodes 122, 124, and 126. An R output terminal R8 of the microcomputer 20 is employed to synchronize the input signals derived from O outputs O0, O1, and O3 through diodes 128, 130, and 132. A series of biasing resistors 134, 136, 138, 140, 142, and 144 are connected to the outputs of the membrane switching devices 102–118. In operation, output signals are sequentially supplied by the O outputs O0, O1, and O3 of the microcomputer 20 and a synchronizing signal is supplied by the R output R8 which allows the microcomputer 20 to scan three membrane switching devices associated for each drive signal. Accordingly, the microcomputer 20 is capable of continuously monitoring the states of the membrane switching devices 102–118 to determine whether user changes have been made during a selected cycle of operation of the diswhasher.

As further illustrated in FIG. 1, means 150 for biasing R outputs R8, R9, and R10 of the microcomputer 20 includes a plurality of resistors and capacitors coupled between such outputs and the −15 volt DC power supply 26. Further, a biasing resistor 152 is connected to the O output O7 of the microcomputer 20 and to the −15 volt DC power supply 26.

Turning now to FIGS. 1 and 2, an indicating and display means 170 for indicating the selected cycles, optional events, the particular event of a selected cycle of operation, and displaying the time remaining in a selected cycle includes a 5×7 array of light-emitting diodes (LED) multiplexed to be responsive to seven drive signals supplied by O outputs O0, O1, O2, O3, O4, O5, and O6 of the microcomputer 20 and five enabling signals supplied by R outputs R8, R9, R10, and O output O7 through input or output gate circuit 40. Accordingly, there are five groups of LEDs with up to seven LEDs within each of the five groups. During each cycle of the AC line, each group is sequentially enabled. The signals O0–O6 control the lighting of each individual LED of a particular group while enabled. Signals O7, R9, and R10 select specific groups for enabling and R8 disables or enables the entire display to prevent any undesired lighting of LEDs while outputs O0–O7, R9, and R10 are being switched.

Individual LEDs indicate the cycle and optional event selected by the user. For example, LEDs 172–182 indicate the cycle selected by the user. LEDs 184–188 indicate the optional event selected by the user. LEDs 190–194 indicate the time period associated with the wash event of a particular selected cycle whether such time period be the preprogrammed time period or a time period selected as an optional event. LEDs 196–120 indicate the particular position and/or event of the selected cycle of operation of the dishwasher. Two seven-segment displays 202, 204 display the time remaining in a selected cycle of operation of the dishwasher. The seven-segment display 202 displays the time remaining in 10-minute intervals and the seven-segment display 204 displays the time remaining in 1-minute intervals. The time remaining displays 202 and 204 are turned on at the beginning of a selected cycle and indicate the total time for the cycle. Thereafter, the displays 202, 204 indicate the time remaining in the selected cycle. The displays 202, 204 automatically correct themselves to show the proper remaining time whenever the cycle or wash time is changed. As best illustrated in FIG. 2, diodes 206, 208, and 210 have been included in the array of indicating and display means 170 to complete the matrix of diodes so that feed-back problems are substantially eliminated.

Continuing to refer to FIG. 2, it can be seen that diodes 172–182 are the cycle indicators 214, the LEDs 184–188 are the optional events indicators 212, and the LEDs 190–200 are the wash time and event indicators 216.

As best illustrated in FIG. 1, an LED and display segment drive circuit 220 is responsive to the seven output signals of the microcomputer 20 and drives the LEDs of the indicating and display means 170. Included in the drive circuit 220 are a series of open emitter transistor arrays which supply the necessary supply current to the individual LEDs and the display segments. The open emitter transistor array may be included in an integrated circuit package of the type identified as CA3082 and manufactured by Radio Corporation of America.

Also, included in the control system 10 is an enabling circuit 230 for enabling the LEDs of the indicating and display means 170 in accordance with the control strategy. Importantly, the enabling circuit 230 includes various gates associated with the input or output gate circuit 40 such as, for example, NOR gates 42 and 44. Also included in the enabling circuit 230 is an integrated circuit package 231 including a series of inverters 232–240. As best illustrated in FIG. 2, the output of inverter 232 is connected to the cycle indicators 214, the output of the inverter 234 is connected to the optional events indicators 212, the output of the inverter 236 is connected to the wash time and event indicators 216, the output of inverter 238 is connected to the 10-minute interval display 202, and the output of the inverter 240 is connected to the 1-minute interval display 204.

The multiplexing scheme associated with driving and enabling the various LEDs can best be described by referring to FIG. 2. Each of the drive signals supplied by O outputs O0, O1, O2, O3, O4, and O5 drive one segment of the 10-minute display 202 and the 1-minute display 204, the optional events indicators 212, the cycle indicators 214, and the wash time and event indicators 216. An O output O6 drives only one segment of each of the 10-minute and 1-minute displays. The condition of the 1-minute interval display is determined by the output O7 and the output R9 as it is expanded through NOR gate 44 and the output is represented by the logic $\overline{O7 \cdot R9}$. It should further be noted that in order for various segments of the 1-minute interval display to be enabled, the output R10 must be of a predetermined condition. The segments of the 10-minute interval display 202 are enabled in accordance with outputs O7 and R10 as expanded through NOR gate 42 and the output is represented by $\overline{O7.R10}$. Again, in order for the 10-minute interval segments to be enabled, the output R9 must be of a predetermined condition. The optional event indicators are enabled by the outputs R9 and R10 as expanded through the input or output gate circuit 40 and the output is represented by R9.R10. In order for the optional event indicators to be enabled, the output O7 must be of a predetermined condition. The cycle indicators are enabled by outputs O7 and R9 which are expanded through input or output gate circuit 40 and the output is represented by O7.R9. In order for the cycle indicators to be enabled, the output R10 must be of a predetermined condition which is different than the predetermined condition necessary for enabling the segments of the 1-minute interval display. The wash time and event indicators 216 are enabled in response to outputs O7 and R10 which are expanded through input or output gate circuit 40 and the output is represented by O7.R10. In order for the wash time and event indicators 216 to be enabled, the output R9 must be in a predetermined condition which is different than the predetermined condition necessary to enable the segments of the 10-minute interval display.

Figure 3:
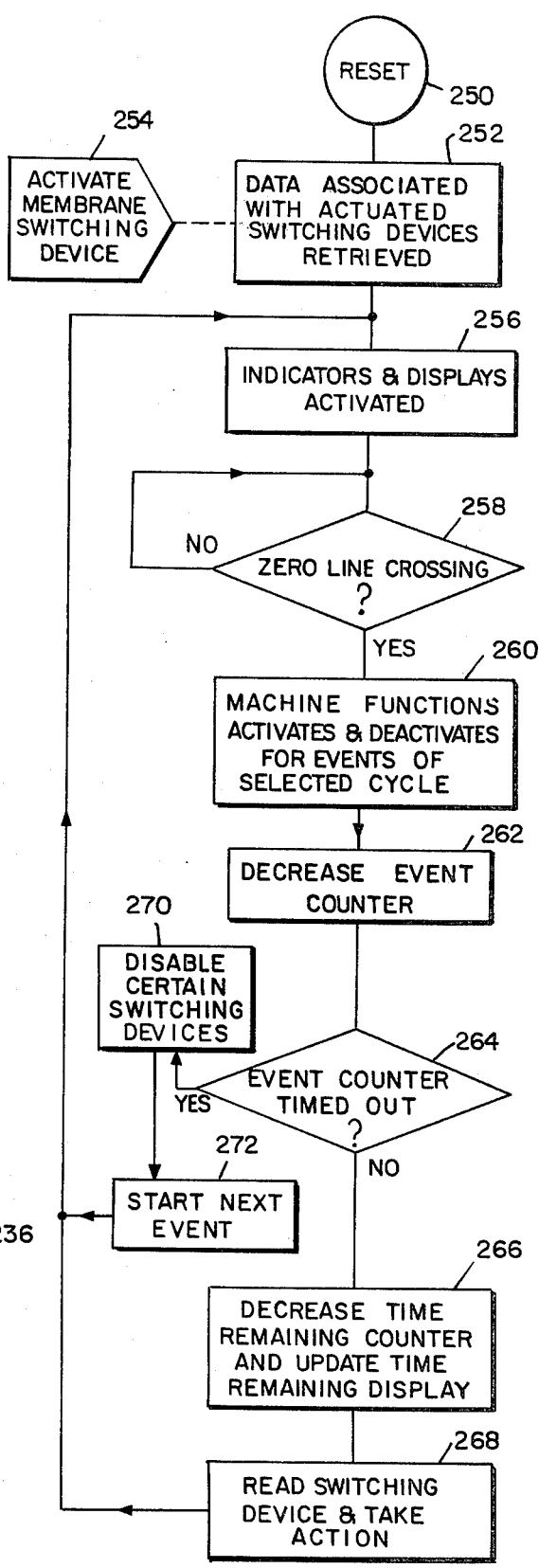
FIG. 3 is a flow diagram charting the sequence of operation of the control system of FIG. 1.

Referring now to FIG. 3, the operation of the control system 10 can best be described by illustrating a series of steps associated with the operation of the microcomputer 20. In response to an input signal at the INIT input of the microcomputer 20, the control system is reset in step 250. The microcomputer 20 is normally in a program loop which is repeated each line crossing of the AC line. In a second step, the data associated with an actuated switching device is retrieved from the memory of the microcomputer and programmed into the resident program for the operation of the dishwasher in accordance with a selected membrane switching device. These steps are illustrated in FIG. 3 as 252 and 254. The microcomputer 20 then provides the necessary drive signals and enabling signals to activate the various indicators and displays in accordance with step 252. The AC line L1, L2 is continuously monitored by the microcomputer 20 to determine when there is a zero line crossing in accordance with step 258. These line crossings provide a means for timing the cycles and events of the dishwasher period. If a zero line crossing does occur, the microcomputer 20 initiates the activation and deactivation of the machine functions for the operation of various events of the selected cycle in accordance with step 260. Further, an event counter contained within the microcomputer 20 is decreased by one interval in accordance with step 262. The event counter is continuously monitored to determine whether the time period associated with a particular event of a selected cycle has been completed in accordance with step 264. If the time period associated with the present event has not been completed, the time remaining counter is decreased by one interval and the time remaining display is updated in accordance with step 266. The microcomputer also continuously monitors and reads the programming means 100 to determine whether there have been any user changes made to the previous selected cycle and optional events and takes the necessary action to correct the program in accordance with such changes. This continuous monitoring and corrective action is accomplished in step 268. If the event counter has timed out the present event, then in accordance with the resident program certain predetermined switching devices of the programming means 100 are disabled in accordance with step 270. At the same time or immediately thereafter, the next event associated with the selected cycle is started in accordance with step 272 and the various steps associated with the resident program are again stepped through to control the operation of the dishwasher.

What is claimed is:

1. A control system for appliances and the like of the type having a plurality of machine functions to be activated and deactivated in accordance with a control strategy and a plurality of cycles of operation each of which is made up of a plurality of events, the control system comprising:

an array of user actuable membrane switching devices for allowing programming of at least one of said cycles of operation, at least one optional event, and a time period for at least one of the plurality of events of the programmed cycle;

a control logic including microcomputer means having a resident program and a memory including performance data and means for storing data;

a display panel including means for indicating the programmed cycle, optional event, time period for the one event, and the time remaining in the programmed cycle during the operation of the appliance;

buffer gate means coupled between said array of switching devices, said microcomputer means and said display panel for increasing the input and output capabilities of said microcomputer means; and said resident program having instruction means for operating said control system including first instruction means for retrieving said performance data from said memory in response to a programmed cycle, second instruction means for activating said display panel in response to said retrieved performance data, third instruction means for activating and deactivating machine functions in accordance with said retrieved data for performing the events of said programmed cycle, fourth instruction means responsive to said retrieved data for determining operational periods for said events of said programmed cycle, fifth instruction means responsive to said fourth instruction means for disabling certain of said switching devices at the completion of performance of certain of said events and for initiating the performance of the next sequential event for said programmed cycle at the completion of each event of said programmed cycle, sixth instruction means responsive to said fourth instruction means for enabling the inputting of certain selections via said array of switching devices during the performance of certain events of said programmed cycle and for returning the performance of said resident program to said second instruction means.

2. The control system as recited in claim 1 wherein the array of membrane switching devices is responsive to three drive signals and an enabling signal.

3. The control system as recited in claim 2 wherein the indicating means includes a plurality of light-emitting diodes multiplexed in an array of five groups, each having up to seven light-emitting diodes.

4. The control system as recited in claim 3 wherein the array includes at least two seven-segment numerical displays for indicating the time remaining in the programmed cycle, each numerical display being responsive to seven drive signals and to one enabling signal.

5. The control system as recited in claim 4 including six programmable cycles and three programmable optional events, the resident program of the control logic including preprogrammed time periods for the one event of each programmed cycle.

6. The control system as recited in claim 5 including three optional programmable time periods for the one event of each programmed cycle.

7. The control system as recited in claim 6 wherein the cycles, optional events, and time periods of the one event are reprogrammable during a predetermined period of time of each programmed cycle.

8. The control system as recited in claim 7 wherein the display panel further includes means for indicating each event of the programmed cycle during operation of the appliance and the time period of the wash event is user programmable by actuating one of the membrane switching devices.

9. The control system as recited in claim 8 wherein the cycles include a normal cycle, a rinse and hold cycle, a reduced water usage cycle, an extended normal cycle, a cancel drain cycle, and a warming cycle; and the wash event for the normal cycle, the reduced water usage cycle, and the extended normal cycle is preprogrammed for time periods of 20 minutes and 30 minutes, respectively.

10. A method of controlling an appliance and the like of the type having a plurality of machine functions to be activated and deactivated in accordance with a control strategy to allow performance of a plurality of cycles of operation each of which includes a plurality of events, comprising the steps of: sequentially driving and enabling a plurality of membrane switching devices user actuatable for selecting one of said cycles of operation of the appliance, optional events of a cycle, and a time period for at least one event of the selected cycle; retrieving data from a microcomputer memory in response to actuation of at least one of said membrane switching devices; activating and deactivating said machine functions in a sequence of prearranged events in accordance with a resident program in said microcomputer and the retrieved data; indicating the selected cycle, the selected optional event and the time period for the one event of the selected cycle from a plurality of selectable cycles, optional events, and time periods; displaying a time period for and the time remaining in a selected cycle; continuously monitoring the membrane switching devices to detect user actuated changes in the cycle, optional event and time periods; and during the time period of the selected cycle, disabling certain membrane switching devices to thereafter eliminate the possibility of user actuated changes associated with such disabled switching devices.

11. The method as recited in claim 10 further including the step of indicating each event as it sequentially occurs in the selected cycle of operation.

12. The method as recited in claim 11 further including the step of driving and enabling a plurality of light-emitting devices to indicate the selected cycle, optional event and time period for the one event and to display the time remaining in the selected cycle.

13. The method as recited in claim 12 further including the steps of multiplexing the light-emitting devices, driving light-emitting devices from each of five groups of light-emitting devices with seven drive signals, and enabling some of at most seven light-emitting devices within each group of light-emitting devices with five enabling signals in accordance with the resident program and the data retrieved from the memory.

* * * * *